Dec. 1, 1964   M. W. LOVELAND   3,159,195
FRUIT PITTING MACHINE
Filed July 1, 1963   14 Sheets-Sheet 1
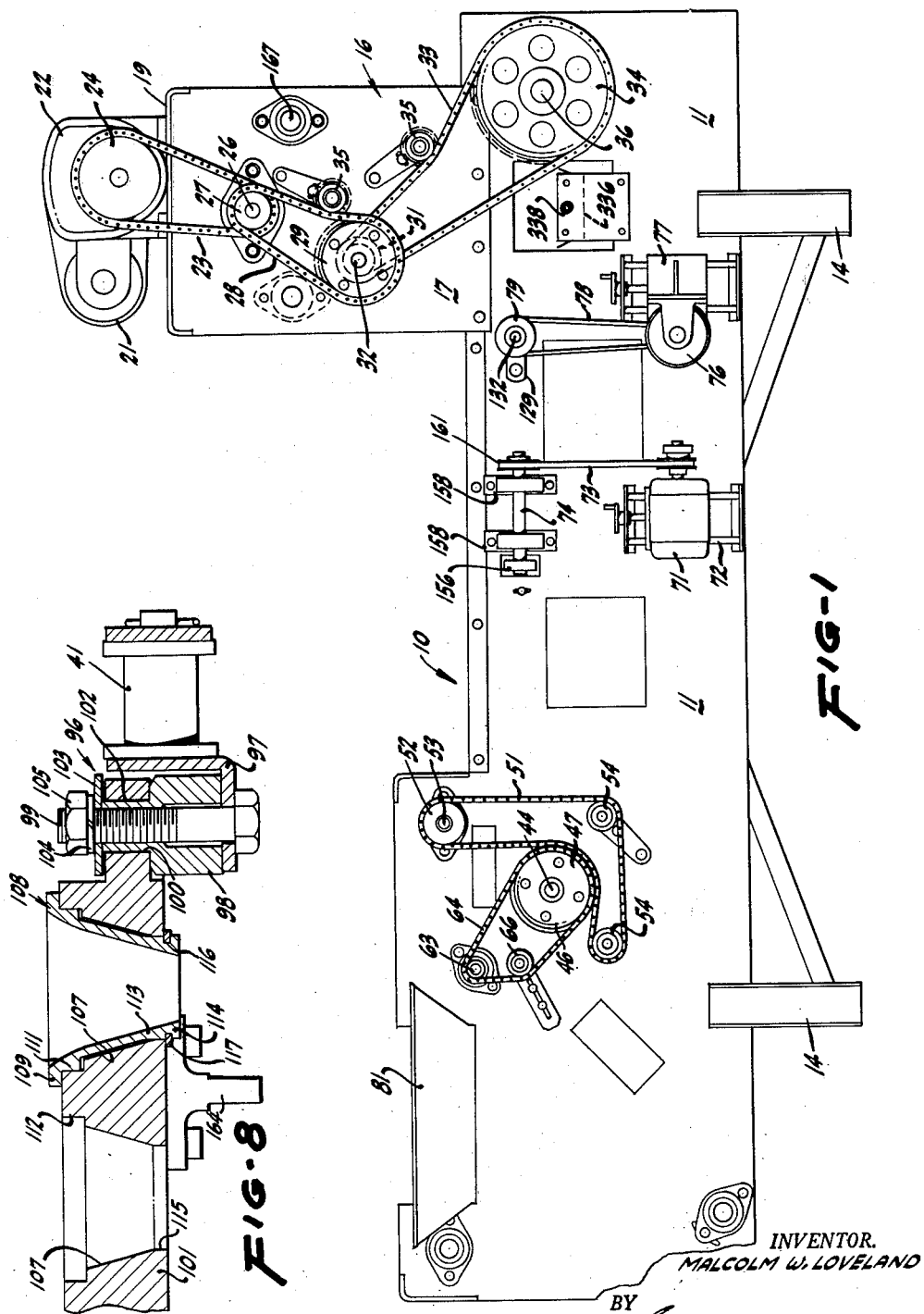
INVENTOR.
MALCOLM W. LOVELAND
BY
ATTORNEYS

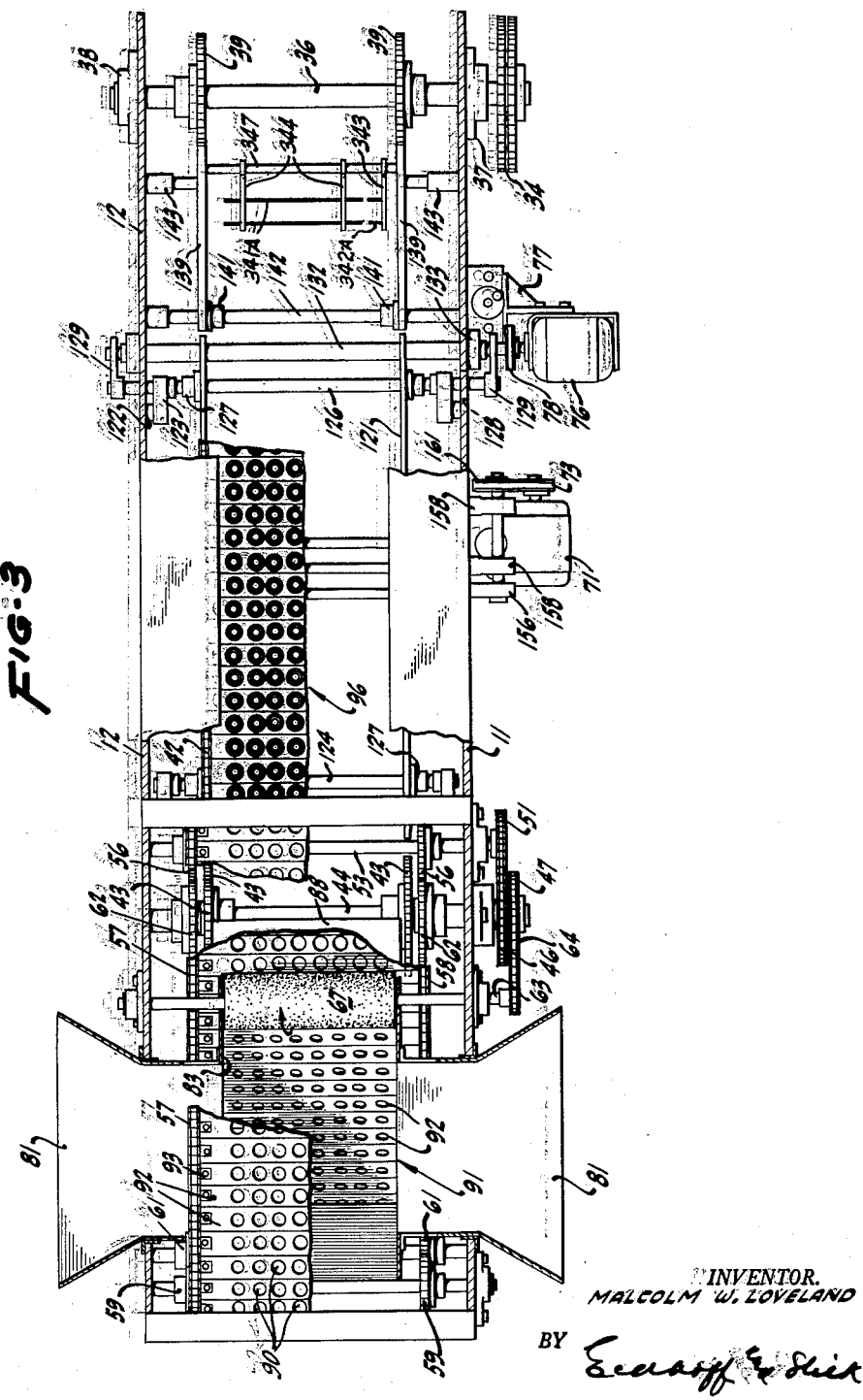

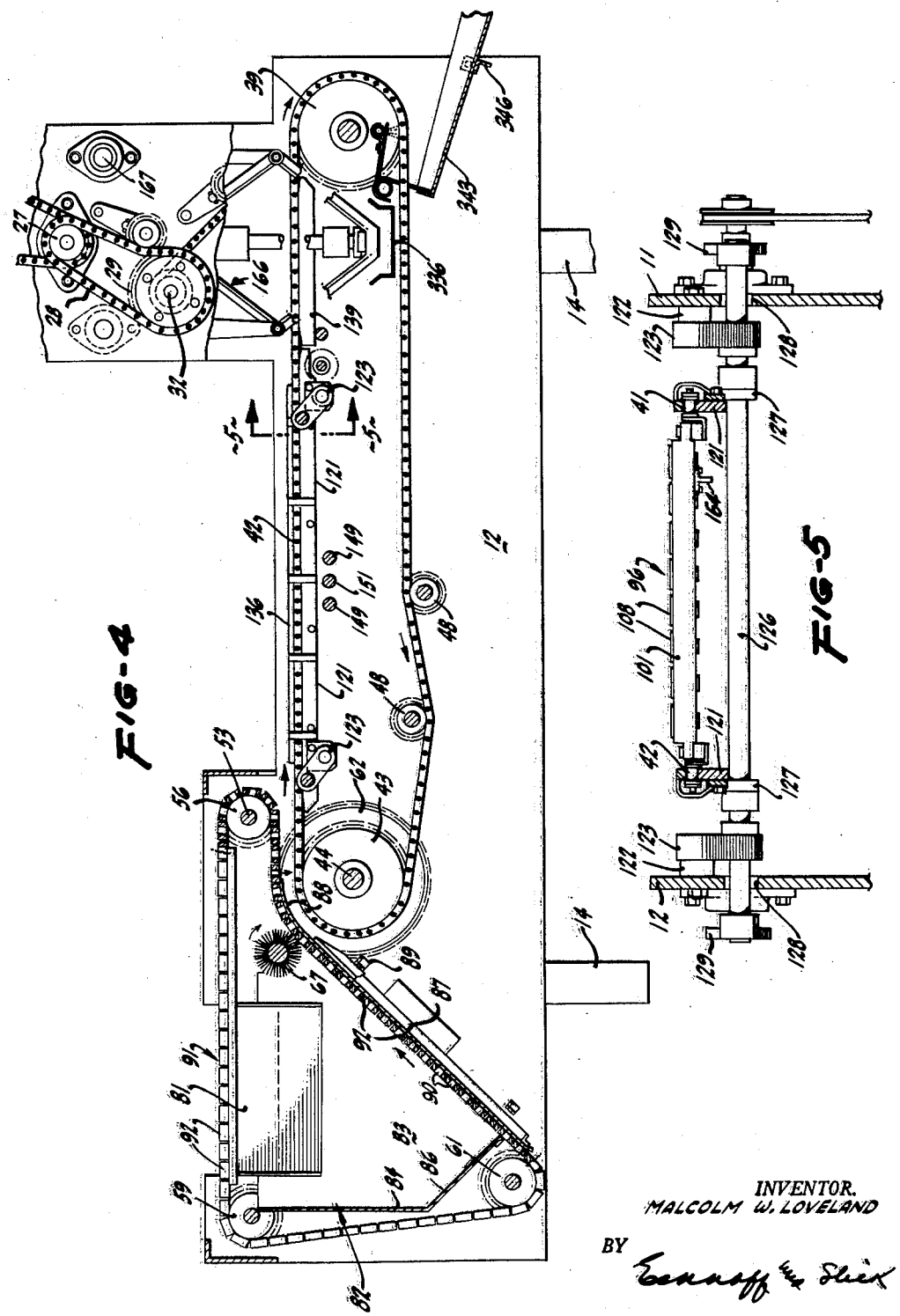

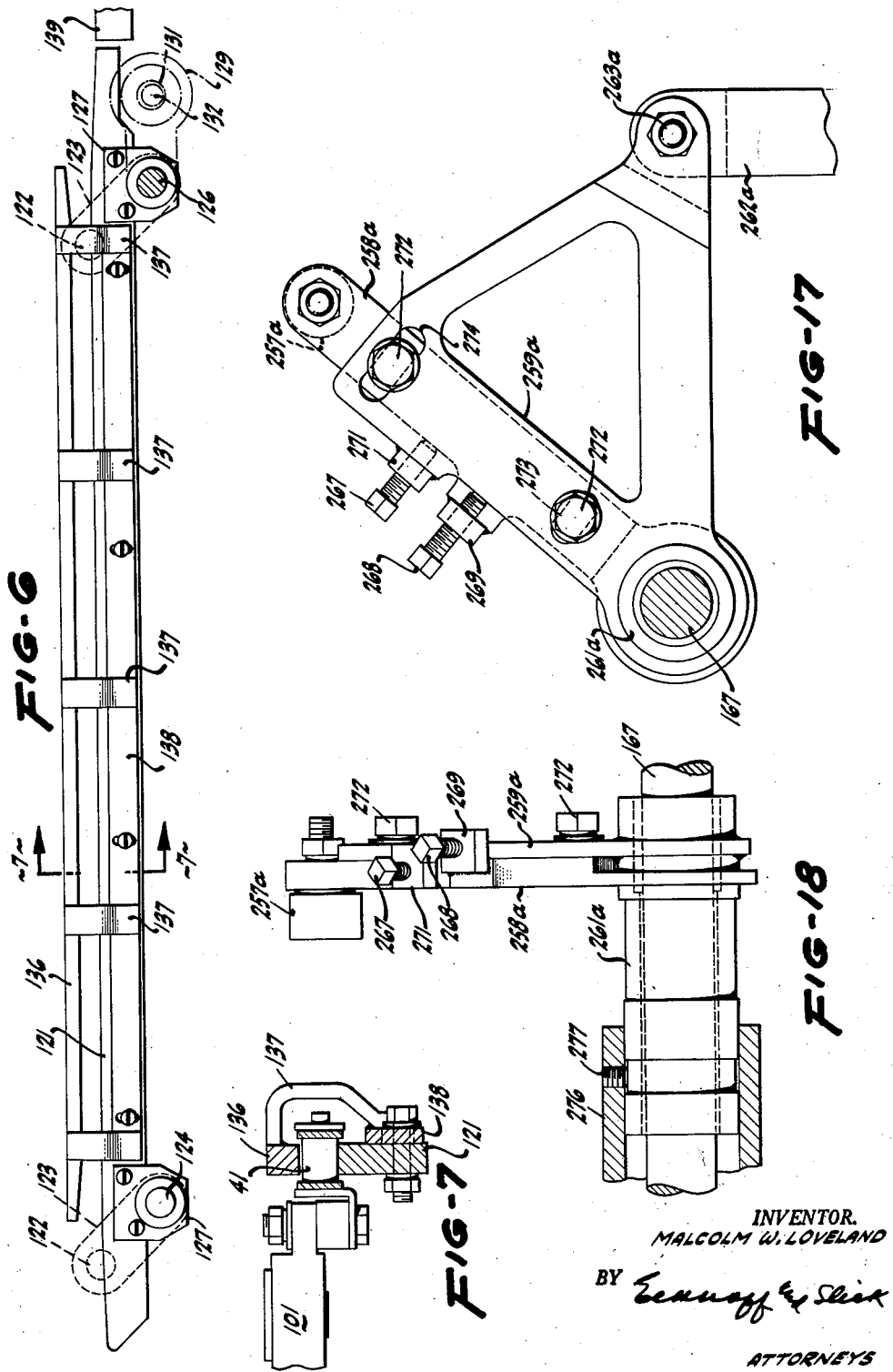

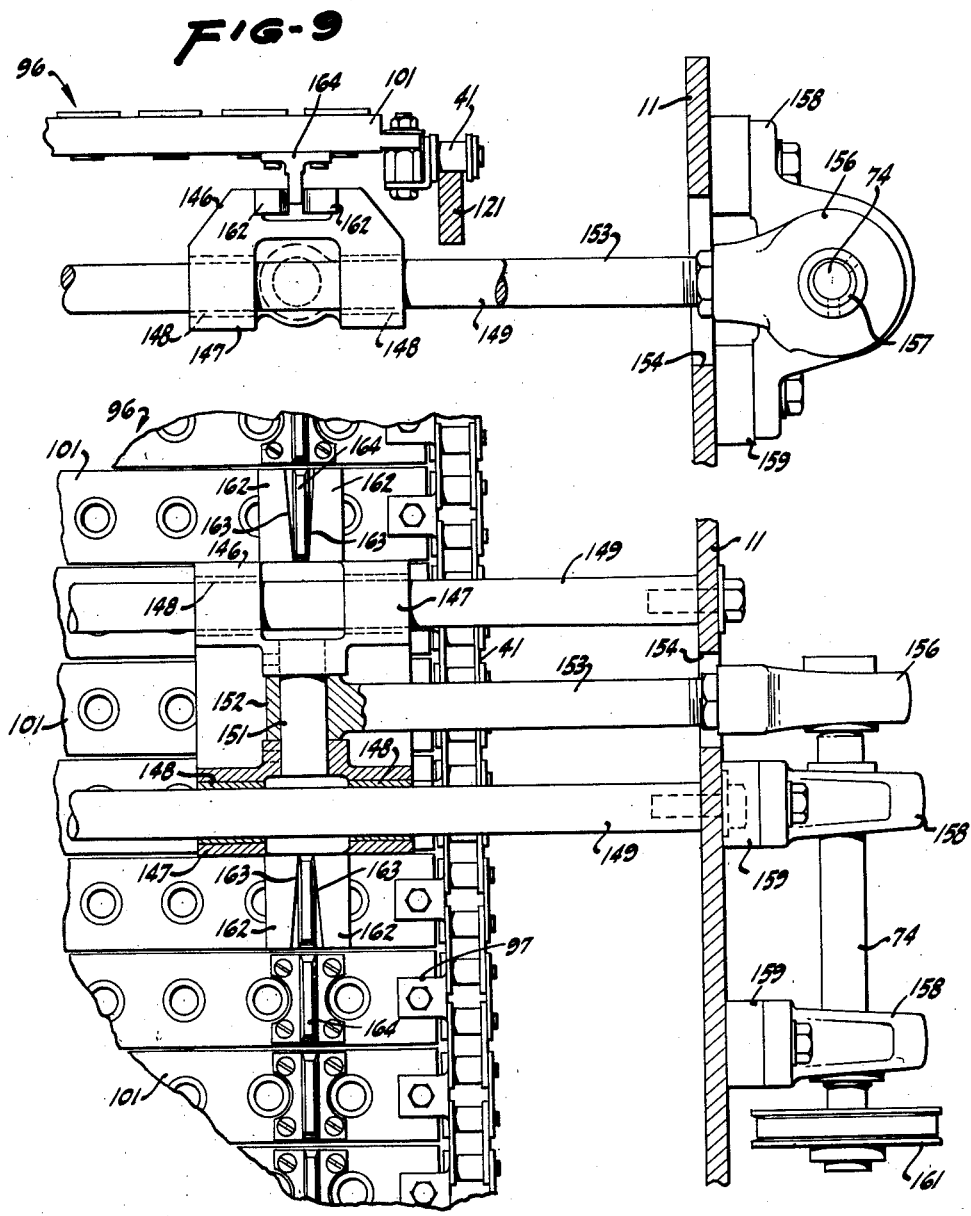

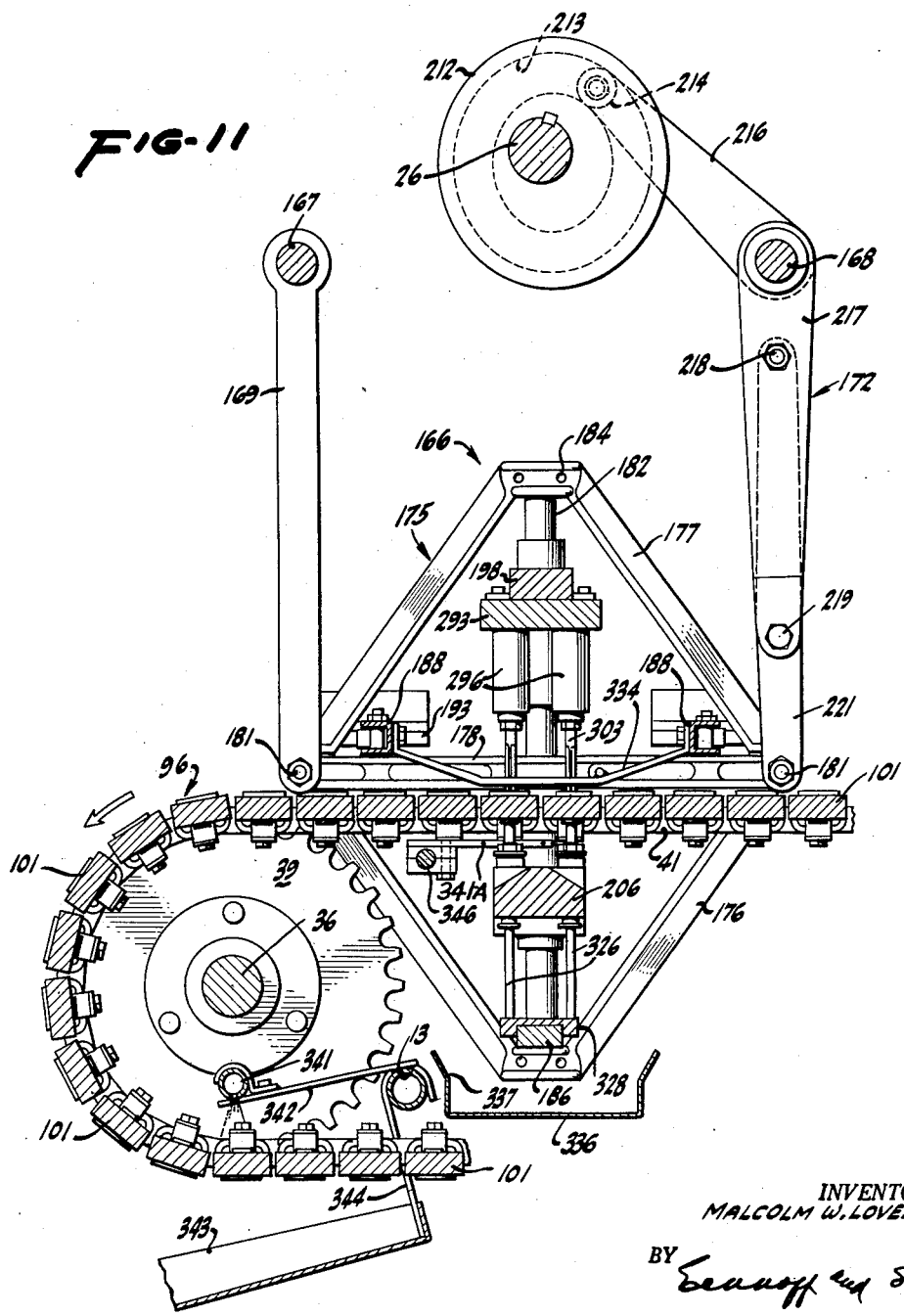

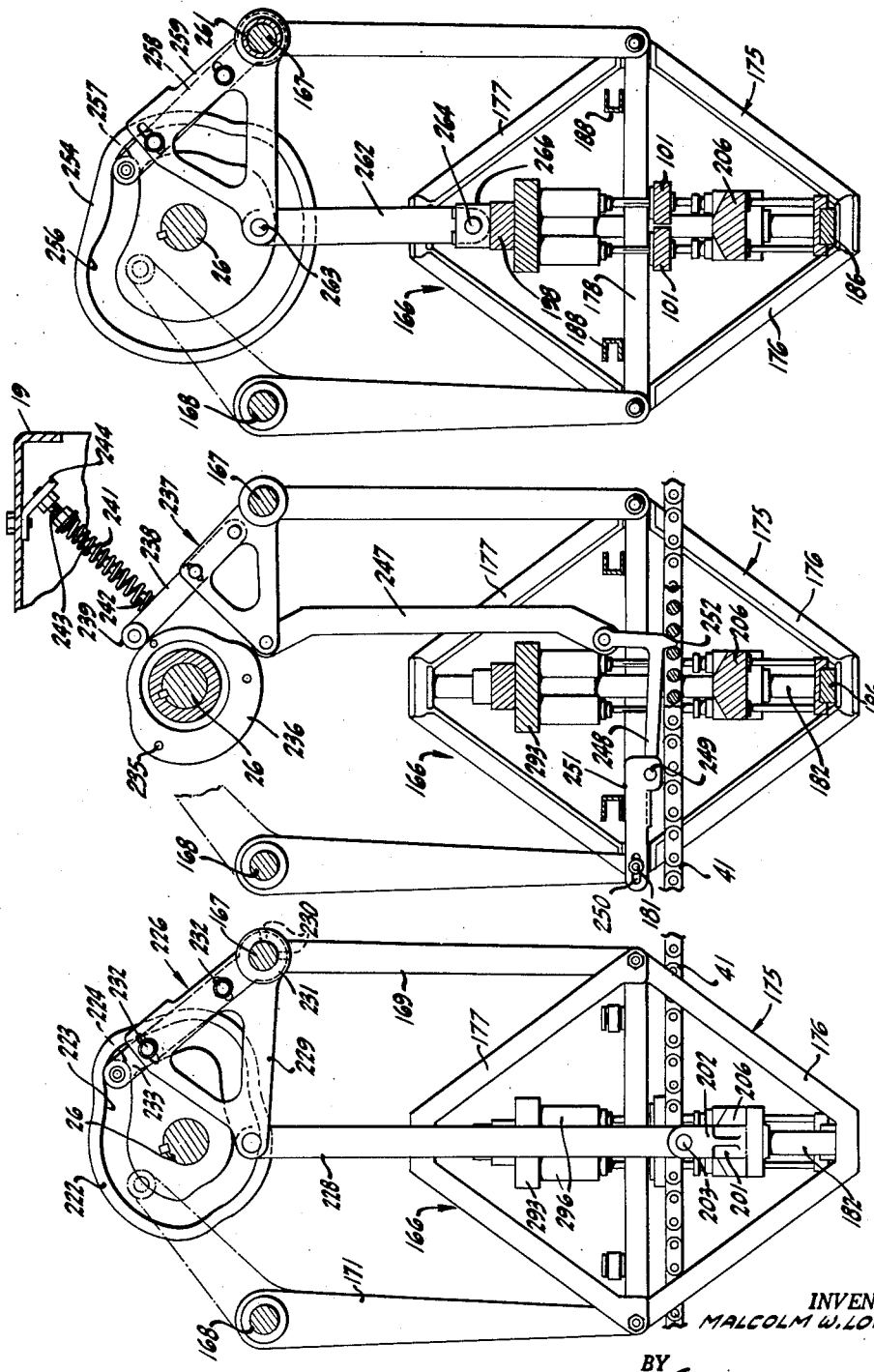

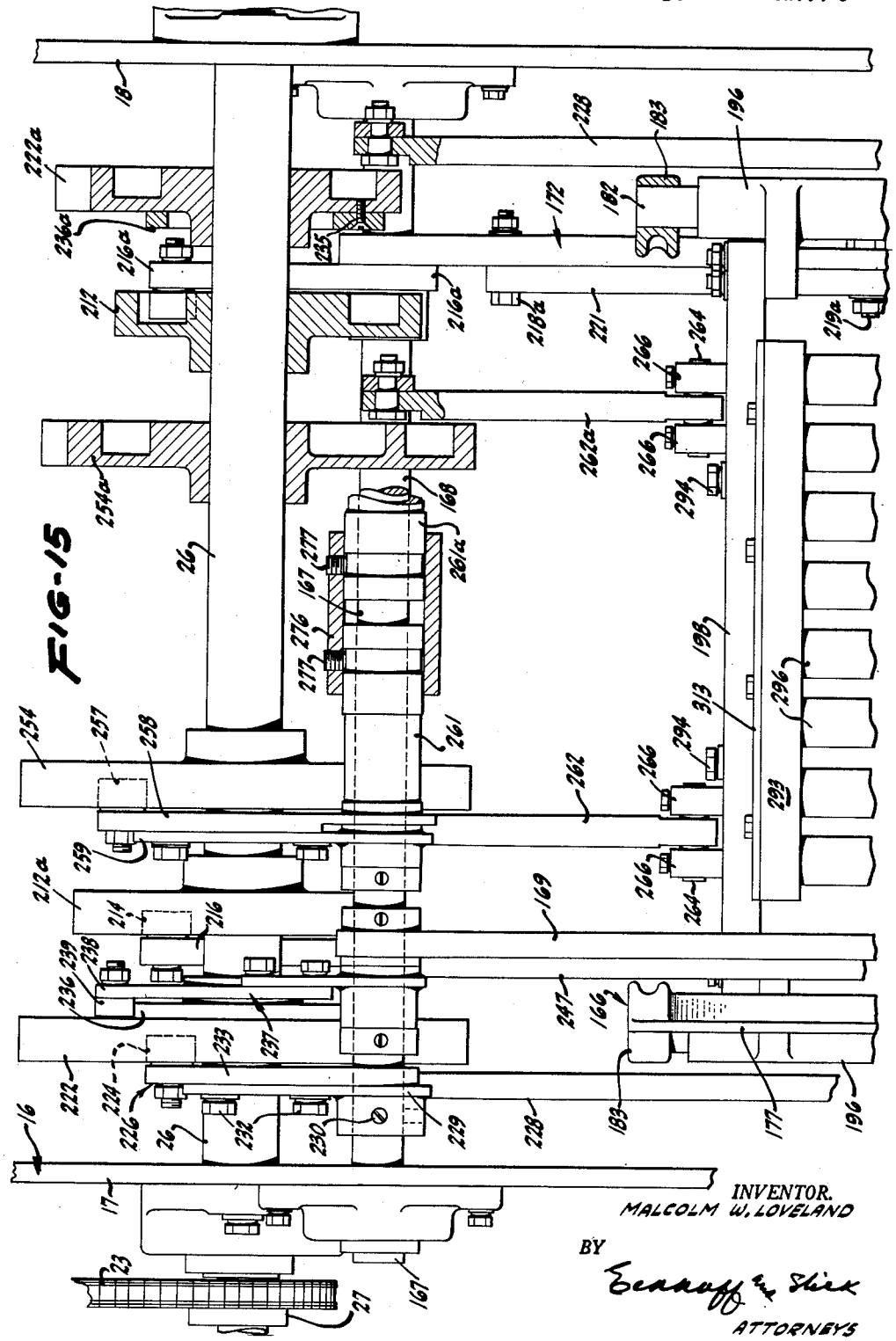

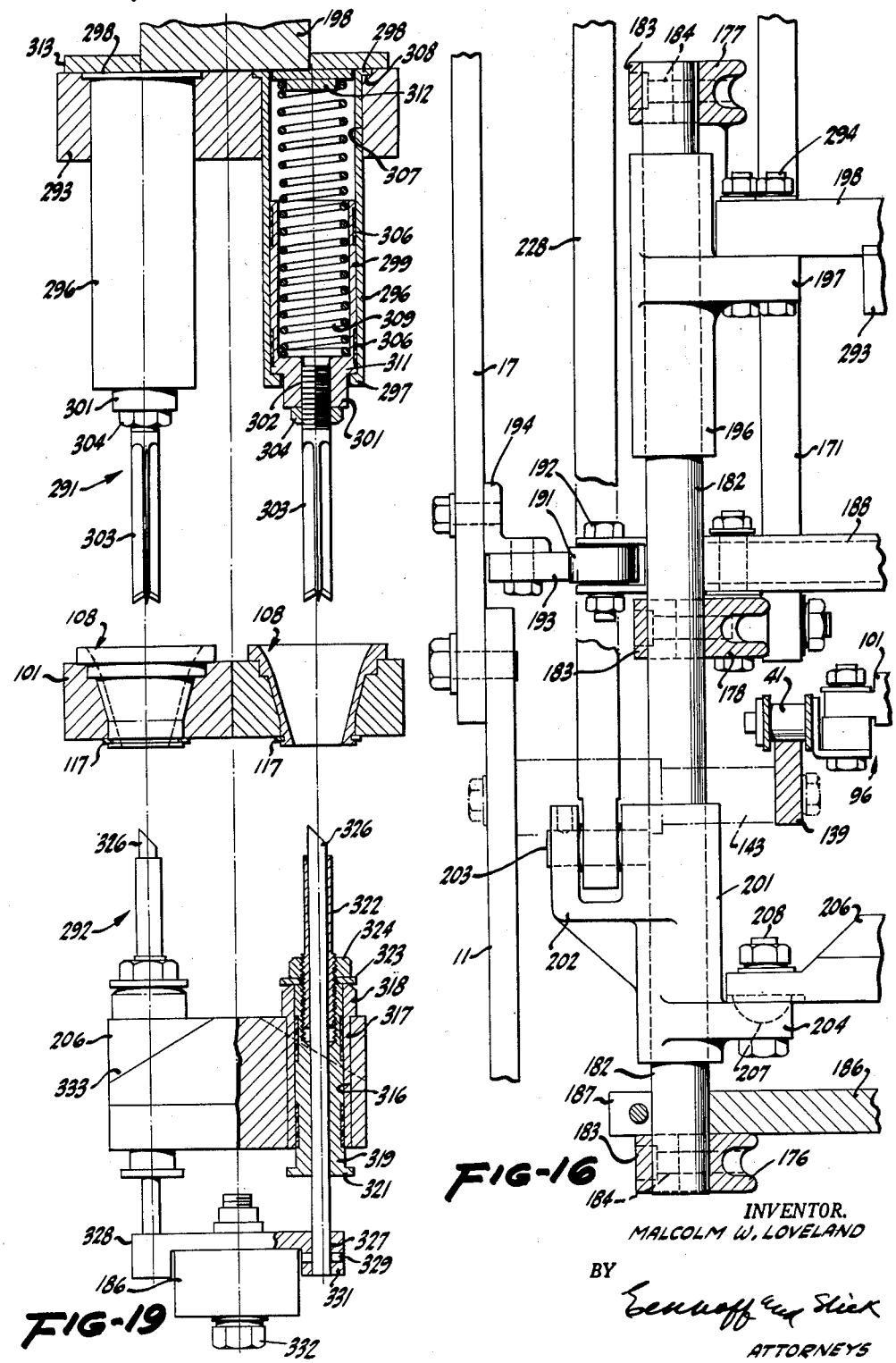

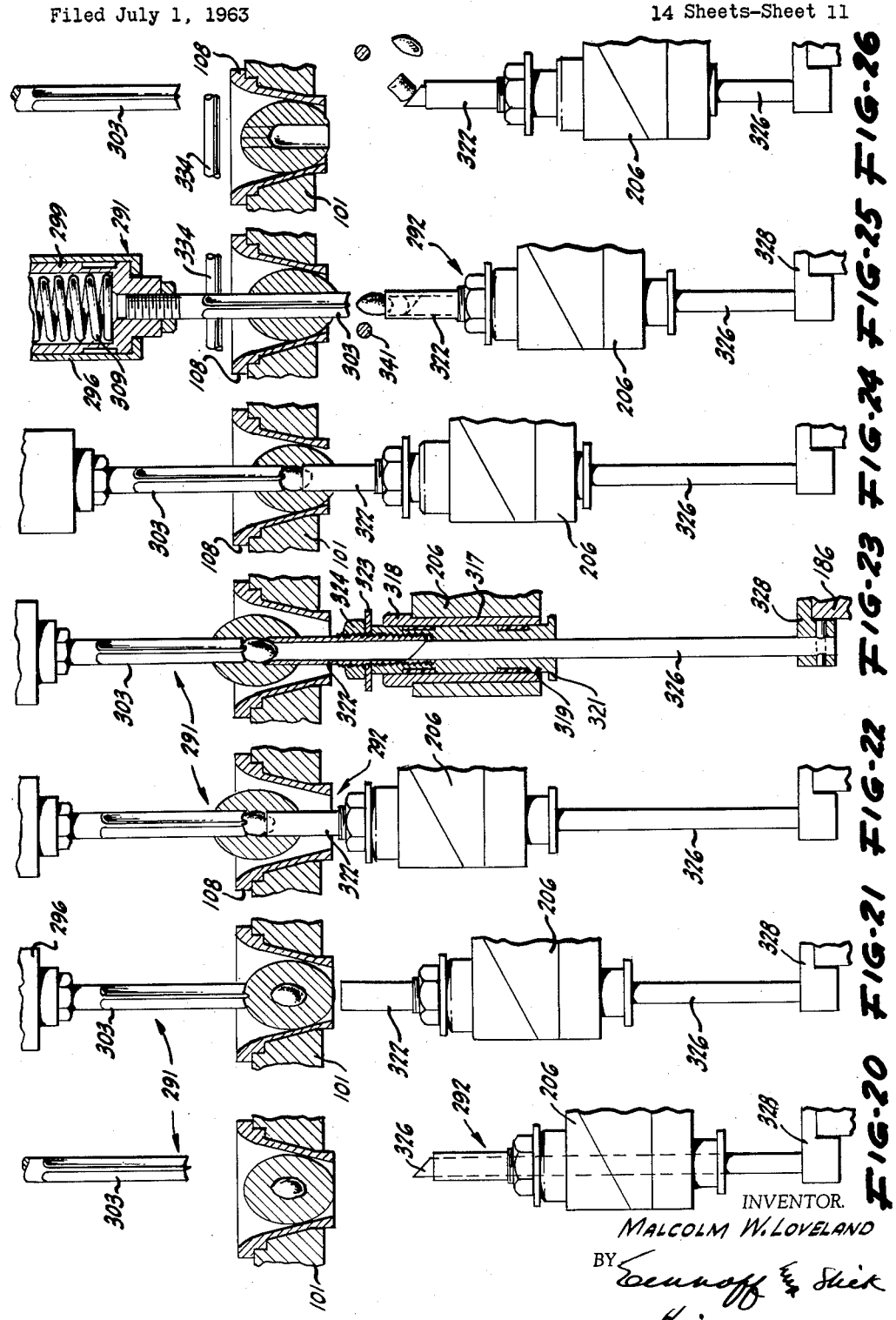

Dec. 1, 1964 M. W. LOVELAND 3,159,195
FRUIT PITTING MACHINE
Filed July 1, 1963 14 Sheets-Sheet 12
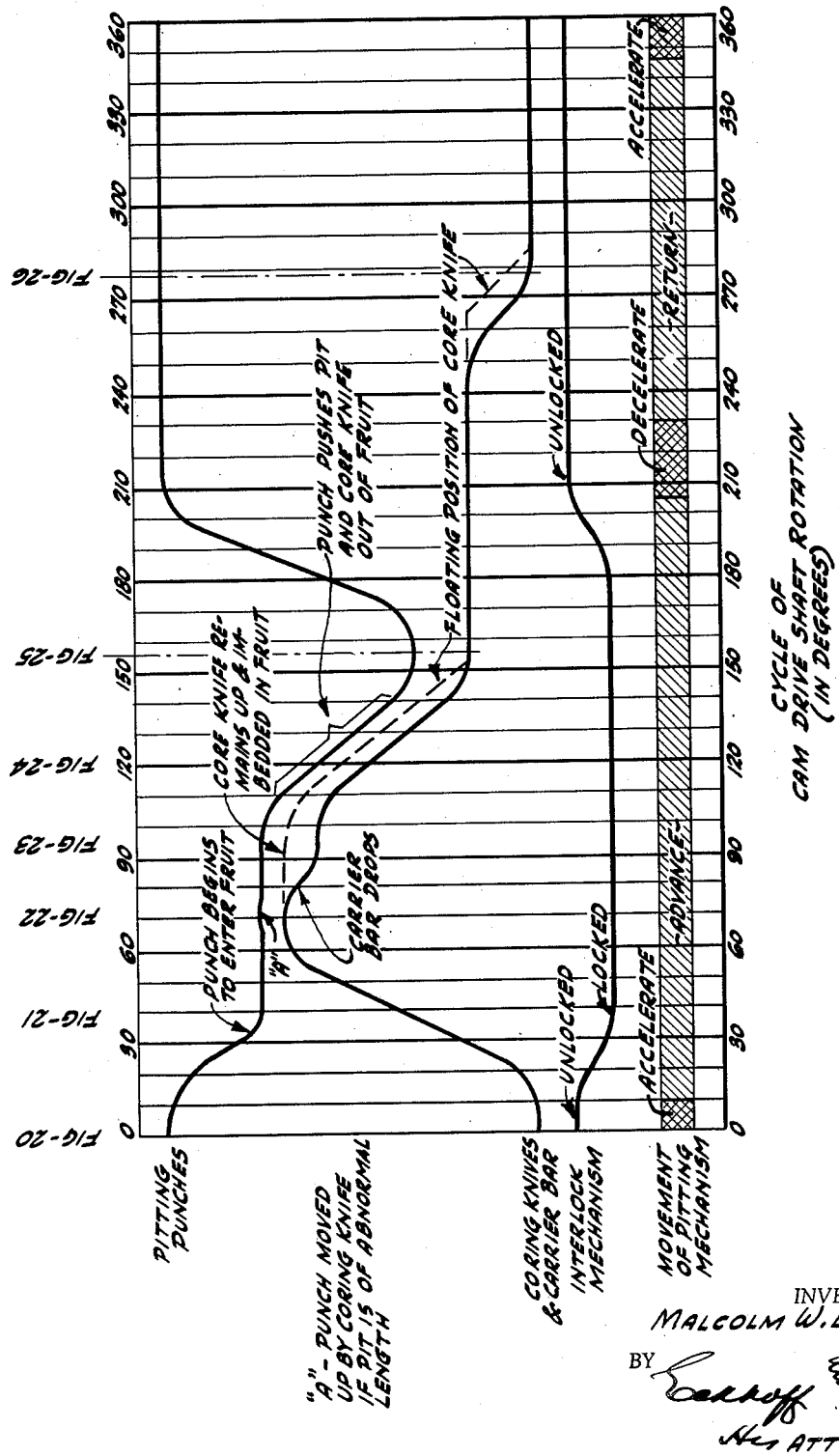
INVENTOR.
MALCOLM W. LOVELAND
BY
ATTORNEYS

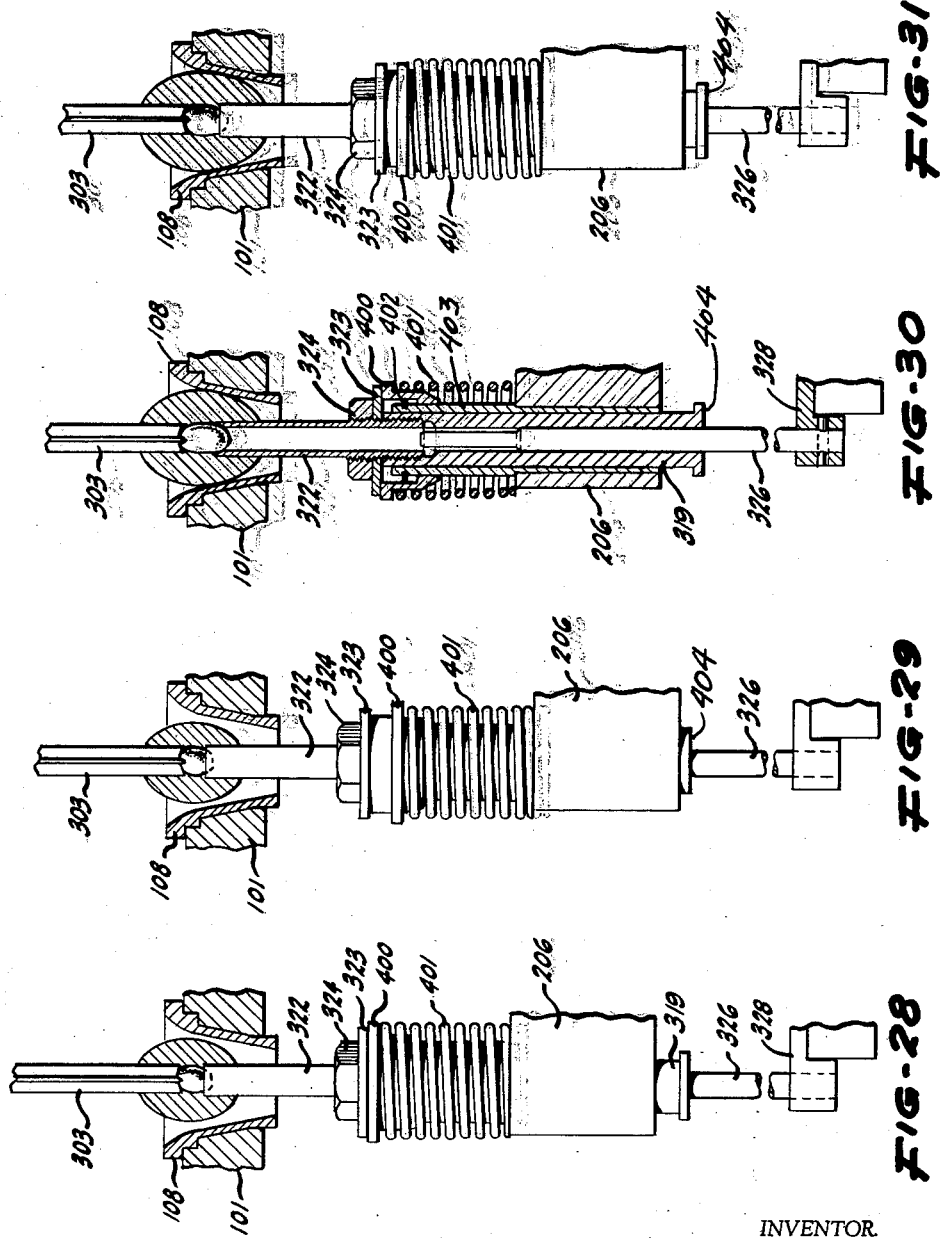

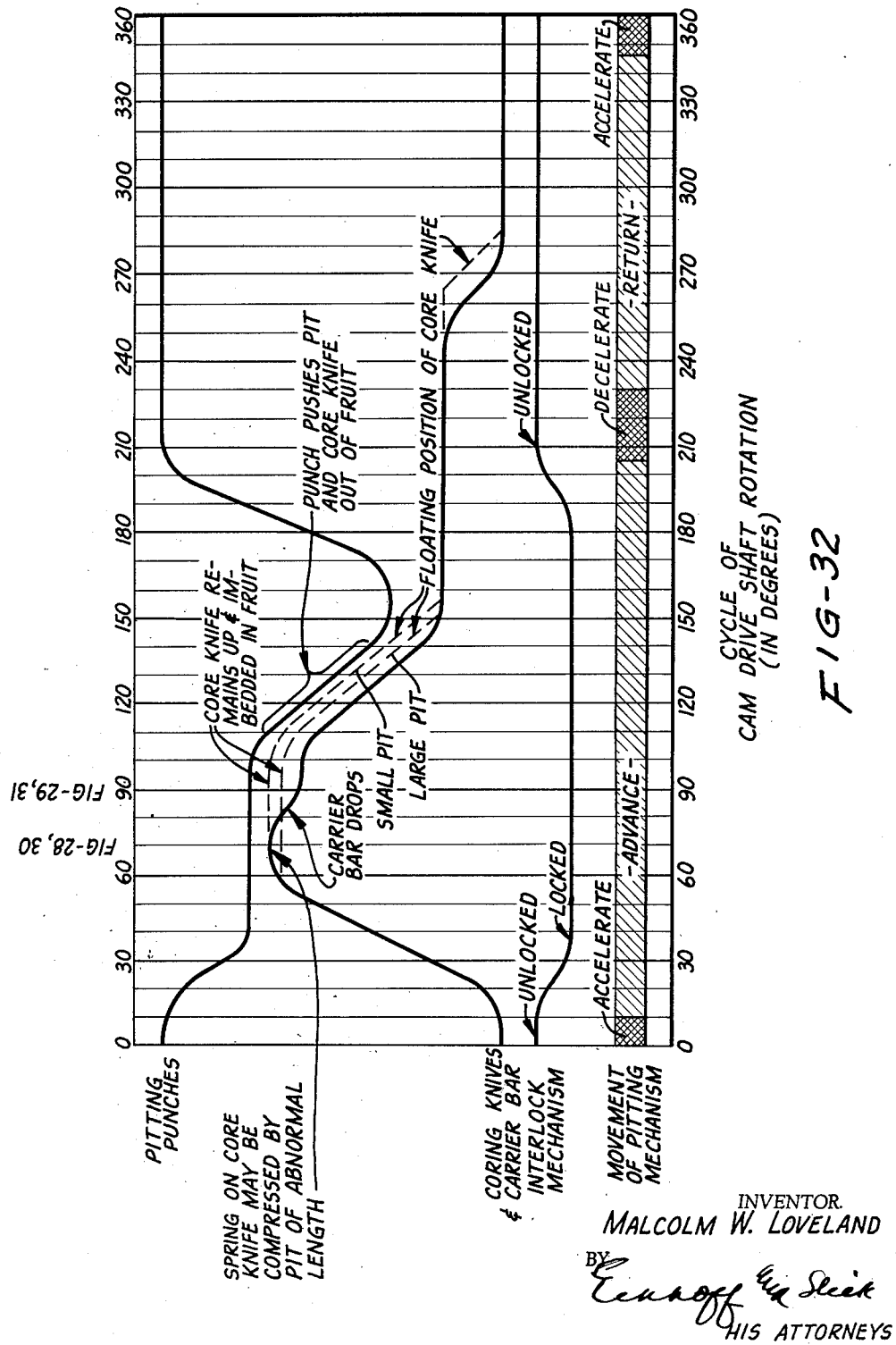

United States Patent Office 3,159,195
Patented Dec. 1, 1964

3,159,195
FRUIT PITTING MACHINE
Malcolm W. Loveland, Orinda, Calif., assignor to Atlas Pacific Engineering Company, a corporation of California
Filed July 1, 1963, Ser. No. 292,800
4 Claims. (Cl. 146—27)

This invention relates to fruit pitting machines and particularly those adapted to the pitting of fruit such as olives, dates, prunes, plums, and the like. The machine is especially designed for high-speed, mass-volume pitting and, in this connection, one of the primary objects is to provide a machine which is simple, rugged, and capable of trouble-free operation for an extended period without requiring service adjustment or maintenance.

The machine of the present invention is relatively rugged and reliable, has relatively few moving parts as compared to machines known heretofore, and requires a minimum of maintenance in spite of its tremendous output of processed fruit.

The invention is particularly directed to and will be described in connection with the removal of the pit or stone from a fruit such as an olive which is of an oval shape in section and in which the pit is elongated and aligned with the major axis of the fruit. However, it will be readily understood that the machine is useful for the pitting of fruit having other than an oval shape, such as prunes.

Fruit pitting machines must be rugged and require a minimum of attendance and maintenance when operated around the clock, day in and day out. Basic to the successful operation of a machine of this type is the requirement that it pit the fruit with a minimum of either fruit spoilage, as occurs in mis-pitting, or fruit wastage, as occurs when the pit is removed together with an inordinately and uneconomically large portion of the fruit. Finally, being possessed of all these desirable characteristics, the machine must additionally be capable of operating at a high sustained rate of producing completely an acceptable pitted fruit. The machine of this invention fulfills adequately each of these requirements.

Fruit pitting machines known and used heretofore have included spring mounted fruit holders to provide flexibility in the timing of the movement of the pitting mechanism and the fruit conveyor. As part of the pitting operation, the spring mounted fruit holder is moved to an extent sufficient to compress the spring. This compression is effected by the pressure of the pitting punch on the fruit. The fruit is held in a position with the spring compressed until the spring can move the fruit along the coring knife and the pitting punch to separate the pit and its attached core from the fruit. Thus, the actual liberation of the pit from the fruit is effected by the spring which must be strong enough to pit the most resistant fruit. As a result, the fruit is forced against the holder under such a pressure that the meat of the fruit is compressed and so damaged. In addition, because of the substantial pressure exerted on the pit in the fruit, the pit is frequently split or broken with the result that the entire pit is not removed, pit fragments remaining in the fruit. These difficulties are obviated in the machine of this invention.

An additional object of the invention is to provide a method of removing pits from fruit wherein the coring knife is driven upwardly into a fruit aligned in a supporting cup and held in position by a pitting punch with resilient back-up means to enable oversize pits to be removed without crushing the fruit during the process. In addition, this method of coring enables the pit to be removed with removal of a minimum of the fruit flesh.

The invention includes other objects and features of advantage which will become apparent hereinafter wherein a prefererd embodiment of the machine is disclosed. It will be understood that the form illustrated and described is that presently preferred and various other forms can be adopted within the scope of the appended claims.

Referring to the drawings accompanying and forming a part hereof:

FIG. 1 is a side elevation of the machine illustrating the major driving mechanisms.

FIG. 3 is a plan view of the machine illustrating the relationship of the conveyor assemblies.

FIG. 4 is a longitudinal section of the machine showing the relative paths of the conveyors and their related parts.

FIG. 5 is a transverse section taken on lines 5—5 of FIG. 4.

FIG. 6 is a side elevation of the vertical reciprocating assembly.

FIG. 7 is an enlarged section taken on line 7—7 of FIG. 6.

FIG. 8 is a detailed section of the pivotal connection between carrier bar and conveyor chain.

FIG. 9 is a transverse detail showing the horizontal reciprocating assembly.

FIG. 10 is a bottom plan view of the assembly of FIG. 9.

FIG. 11 is a right side elevation of the punch and coring knife support mechanism with its actuating cam and lever.

FIG. 12 is an elevation of the cam and linkage for operating the coring mechanism.

FIG. 13 is an elevation showing the mechanism for interlocking the conveyor and the pitting mechanism.

FIG. 14 is an elevation of the punch operating cam and linkage.

FIG. 15 is a detailed elevation, partially in section, illustrating the cam and linkage assemblies.

FIG. 16 is an enlarged elevational detail, partially in section, showing the slidable mounting of the punch and coring knife support members on the pitting mechanism.

FIG. 17 is a detailed side elevation of the punch operating linkage.

FIG. 18 is a front elevation of the mechanism shown in FIG. 17.

FIG. 19 is a side elevation, partially in section, showing the pitting punches, fruit receiving cups, coring knives and ejector plungers just prior to fruit engagement.

FIGS. 20 through 26 are a series of consecutive views illustrating the relative positions of the moving parts during the cycle of pit removal.

FIG. 27 is a diagram showing the sequence of movement of cooperating elements during one complete cycle of operation.

FIGS. 28 through 31 are several fragmentary views illustrating the action of the pitting mechanism when a light spring is included in the mounting for the coring knife; FIG. 30 is in section to illustrate the construction including a light spring for the coring knife.

FIG. 32 is a diagram showing the sequence of movement of cooperating elements during one complete cycle of operation utilizing the light spring mounting for the coring knife as shown in FIGS. 28 through 31.

Figure 2:
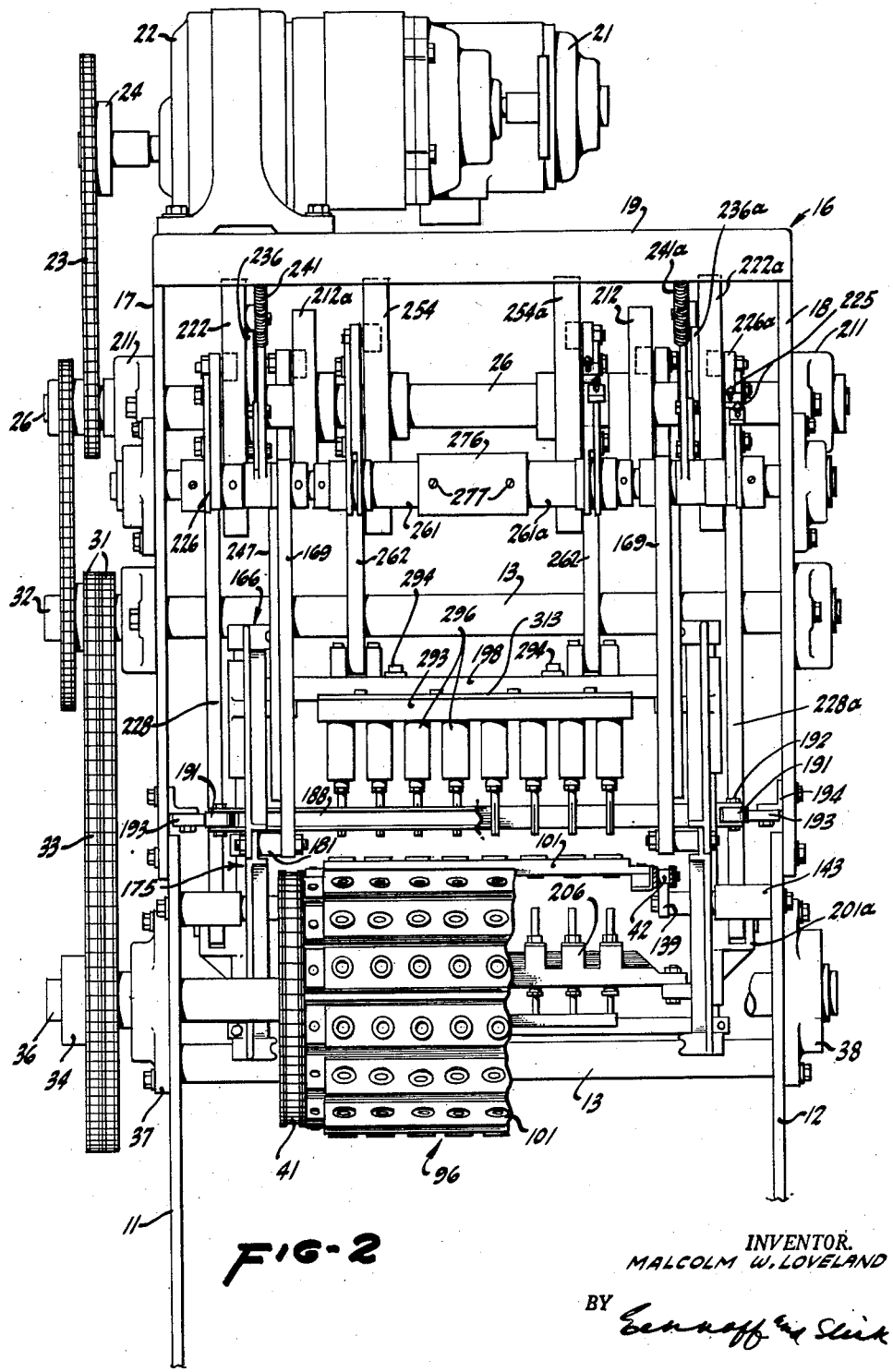
FIG. 2 is a front elevation with some portions broken away to illustrate parts otherwise hidden.

The machine comprises a frame structure 10 made up of side plates 11 and 12 secured together in part by a plurality of spacer elements 13, and supported by braced leg members 14. A superstructure 16 is bolted to the upper front portion of plates 11 and 12 and comprises a pair of side plates 17 and 18 topped by a transverse plate 19.

To provide a drive, motor 21 and speed reducing device 22 are mounted on plate 19 and a chain 23 is driven by sprocket 24 on the speed reducer to rotate transverse shaft 26 to which are affixed the cams controlling the movement of the pitting mechanism, as will be related in detail hereinafter.

Sprocket 27 is rigidly affixed to shaft 26 and drives chain 28 to rotate sprocket 29 and a double sprocket 31 attached thereto on an idler shaft 32. Chain 33 in turn drives sprocket 34 affixed to the main conveyor chain drive shaft 36. Chain slack take-up devices 35 are provided on side plate 17.

Main drive shaft 36 (FIG. 3) is journalled in bearings 37 and 38 on side plates 11 and 12; the drive shaft has a pair of sprockets 39 mounted thereon to drive the main conveyor chains 41 and 42 (FIG. 4). Toward the rear end of the machine a pair of sprockets 43 (FIGS. 3 and 4) are affixed to transverse shaft 44 also journalled in side plates 11 and 12 and extending through plate 11 and having sprockets 46 and 47 thereon (FIG. 3). Adjustable idler elements 48 (FIG. 4) provide for take-up of chains 41 and 42. Sprocket 46 (FIG. 1) drives the hopper feed conveyor through said chain 51 and sprocket 52 fastened to shaft 53 journalled in plates 11 and 12. Two idler sprockets 54 complete the drive assembly, one of these being adjustable to control the tension in chain 51 (FIG. 1).

A pair of sprockets 56 (FIGS. 3 and 4) are affixed to shaft 53 for driving conveyor chains 57 and 58 which extend around pairs of idler sprockets 59 and 61 at the top and bottom rear of the frame machine structure to move the feed conveyor angularly upward over a pair of large idler sprockets 62 supported on shaft 44. Outer sprocket 47 (FIG. 1) attached to shaft 44 drives transverse shaft 63 through chain 64. Centrally mounted on shaft 63 is a rotating brush element 67 (FIG. 3). An adjustable idler 66 is provided for chain take-up.

Power for horizontal reciprocating movement of the conveyor feed chains is provided by motor 71 supported on side plate 11 by an adjustable mounting element 72 (FIG. 1). A belt 73 connects the motor to the shaker assembly drive shaft 74. Power for the vertical reciprocating movement of the conveyor is provided by motor 76 supported on adjustable mounting 77 through belt 78 driving pulley 79 (FIG. 1).

A pair of feed chutes 81 (FIGS. 3 and 4) are provided at the rear end of the machine for directing fruit into hopper 82 having side walls 83, a rear wall 84, an inclined wall 86 and a plate 87. The plate 87, as shown in FIG. 4, has an arcuate upper portion 88 mounted on transverse support members 89 extending between side plates 11 and 12. A conveyor assembly 91 is moveable through the hopper and comprises a plurality of apertured bar members 92 bolted to angle extension 93 on chains 57 and 58. The hopper conveyor chains 57 and 58 pass upwardly over an inclined path from idlers 61 to sprockets 62, moving the bar members 92 up inclined plate 87. Fruit falls into the apertures 90 in bars 92 to be carried past the brush 67 to a point beyond the arcuate end 88 of plate 87 where they drop into cooperatively positioned cups in the main feed conveyor assembly 96. Fruit which is not in a cup is swept back by the brush 67.

In the detail of the conveyor assembly 96 shown in FIG. 8, conveyor chain 41 has angle extensions 97 to which members 98 are fastened by bolts 99 and washers 103 and 104. A plurality of parallel spaced bars 101 are mounted between the chains 41 and 42 in such a manner that a limited displacement of the bars can occur and so obviate friction between the bars and the chains as the conveyor so provided is moved over its path. This mounting of the bars is achieved by providing member 98 with a portion 102 fitting in aperture 100 in the end of bar 101. The portion 102 is longer than the width of the bar 101 and a clearance therefor exists between washer 103 and the end of the bar 101.

Each of the bars 101 is formed with a plurality of equally spaced apertures 107 having a generally conical shape to accommodate fruit-aligning cups 108. The cups are designed to aid fruit deposited therein to align itself with its major axis vertical upon being subjected to vibratory action of the mechanism for moving the cup simultaneously in both a horizontal plane and in a vertical plane. I have found that simultaneous vertical and horizontal movement results in a substantial reduction in fruit which is cross-pitted and particularly fruit which is not pitted on its major axis. For example, comparing the operation of a prior art machine having only vertical movement with my machine providing movement in both a horizontal plane and a vertical plane, the following results were obtained and which are expressed on the basis of one hundred olives:

|  | Vertical Vibration Only | Vibration Both Planes |
|---|---|---|
| Cross-Pitted fruit | 2.5 | 1 |
| Pitting axis—degrees to the vertical: |  |  |
| 20°–30° | 2.9 |  |
| 10°–15° | 45.0 | 2 |
| 5° or less | 49.6 | 90 |
|  | 100 | 100 |

The more perfectly pitted fruit obviously provides a better product for the market.

In the form of cup shown, the lower and major portion of the cup interior is of an inverted conical configuration with opposite walls converging at approximately 20° to 40°, preferably at about 30°, while the upper portion is flared outwardly in a curve fairing into the lower portion. This configuration facilitates the orientation of oval fruit in a vertical attitude with its major axis in line with the axis of the cup and properly positioned for pitting. One can use a cup of any suitable configuration, but that described has given excellent results.

The cups 108 (FIG. 8) are formed with an annular top flange 109 which rests on the carrier bar 101. Each cup is aligned by an annular shoulder 111 fitting into counterbore 112, in the bar 101. Each cup includes a tapered section 113 and a lower cylindrical portion 114 fitting into bore 115 in bar 101 and having an annular recess 116 for a snap ring 117 to retain the cup in position.

The conveyor chains 41 and 42 move over a pair of laterally spaced oscillating rails 121 (FIGS. 5, 6 and 7) which are pivotally supported at 122 on the side plates 11 and 12 by angularly disposed link members 123 adjacent each end of rails 121 (FIG. 4). Transverse rods 124 and 126 are installed between the lower ends of each pair of links 123. Mounted on each of the rods 124 and 126 intermediate the links 123 are a pair of brackets 127 bolted to guide rails 121. The forward rod 126 is sufficiently longer than rod 124 to pass through slots 128 (FIG. 5) in side plates 11 and 12 for attachment of a pair of links 129 (FIGS. 1, 3 and 6) which are reciprocated upon rotation of eccentric bushings 131 which are affixed to transverse shaft 132 journalled in bearings 133. Pulley 79 fastened to one end of shaft 132 provides for driving by motor 76. As shaft 132 is rotated at high speed, connecting links 129 transmit motion through transverse rod 126 and brackets 127 to guide rails 121, with a resultant rapid movement of these members and the conveyor chains 41 and 42 supported thereby in a vertical plane and fore and aft of the frame.

Upper bumper rails 136 prevent "floating" of the conveyor assembly during operation. The rails 136 are adjustably positioned a short distance above chains 41 and 42 and are supported by a plurality of arcuate fingers 137 welded to plate 138 which is in turn bolted to rails 121.

A pair of supplemental guide rails 139 are provided forward and in line with vibrating rails 121. Rails 139 are supported by brackets 141 mounted on transverse rod 142 extending between side plates 11 and 12, and a pair of forward spacer elements 143.

Means are provided approximately halfway between the ends of rails 121 to impart an oscillating movement to the conveyor bars 101 in a horizontal plane (FIG. 9). This assembly comprises a member 146 having downwardly depending bosses 147 with bearings 148 for slidable engagement with a pair of spaced transverse guide rods 149 fastened between side plates 11 and 12. A crank pin 151 (FIG. 10) is mounted in body 146 to provide a pivot for coupling 152 on one end of connecting rod 153, the rod 153 passing through opening 154 in side plate 11. A roller bearing drive fitting 156 is adjustably secured to the other end of rod 153 and is reciprocated by eccentric bushing 157 on drive shaft 74 journalled in bearings 158 mounted on side plate 11 with spacers 159. A pulley 161 affixed to one end of shaft 74 is driven by motor 71 (FIG. 1) through belt 73 to provide rapid vibration of body 146. Mounted on the top of body 146 are a pair of parallel guide bars or rails 162 having tapered ends 163 providing a channel for receiving the lower extremity of the T-shaped fittings 164 bolted to each main conveyor bar 101. Thus, as the conveyor is driven over the shaker body 146, a rapid vibratory movement in a horizontal plane is transmitted through the fittings 164 to cup-supporting bars 101.

The rate of oscillation of the conveyor in either plane is in part a function of the weight of the conveyor undergoing shaking and in part a function of the size of the fruit. I have used speeds of from 1200 to about 2400 oscillations per minute in each plane, excellent results being secured at about 1750 oscillations per minute.

Pitting Mechanism Support Structure

The pitting mechanism indicated generally as 166 (FIG. 11) is suspended from a pair of transverse shafts 167 and 168 which extend between side plates 17 and 18. Links 169 pivotally supported on shaft 167 carry the forward end of mechanism 166 while cam-operated bell cranks 171 and 172 carry the rear end to provide for oscillation of the pitting mechanism.

The pitting mechanism 166 includes generally a pair of spaced diamond-shaped side frames 175 (FIGS. 11–14) with transverse inter-connecting members 188. Each of the side frames 175 includes a lower V-shaped element 176, an upper inverted V-shaped element 177, and a centrally positioned cross bar 178, all being provided with holes at their opposite ends for receiving fittings 181 for pivotal attachment to the support members 169, 171 and 172 (FIG. 11).

A vertical guide rod member 182 is mounted in the middle of each frame 175 to provide support for the vertically reciprocating pitting mechanism. Saddle-like fittings 183 (FIG. 16) are secured by studs 184 at the top, middle and bottom of each side frame to secure rod 182 to the carriage frame members 176, 177 and 178. A transverse cross bar member 186 with split ends 187 is bolted to the bottom end of rod 182 to interconnect the bottom portions of the side frames while a pair of channels 188 are bolted transversely across cross bars 178 to complete the carriage structure. Roller elements 191 are fastened to each end of channels 188 by fittings 192 to run on tracks 193 bolted to side plates 17 and 18 through angle brackets 194 (FIG. 16). Thus, lateral guiding and stability is provided during movement of the carriage assembly, preventing any possibility of misalignment due to side sway.

Slidably mounted on the upper portion of rod 182 on each side frame is a sleeve fitting 196 having a laterally projecting arm 197 bolted to transverse cross bar 198 supporting the punch assemblies (FIG. 16). A pair of sleeve fittings 201 are also slidably mounted on the lower portion of rods 182. Fitting 201 incorporates a clevis-like projection 202 at its upper end with a pivot pin 203 for attachment of connecting link 228. An inwardly projecting arm 204 at the lower and opposite side of fitting 201 provides for attachment of a transverse member 206 in which are mounted coring knives 322 (FIG. 19). Member 206 is provided with bevelled cutaways 333 to assure against undesired piling up of pits and cores. To facilitate replacement or exchange of the coring knives 322 and support 205 as a unit, attachment is made to arm 204 utilizing a Woodruff key 207 and a pin (not shown) which serve to locate the support 206 in position in which it is retained by bolts 208.

Control Mechanism

As is shown in FIG. 2, transverse shaft 26 is journalled in bearings 211 mounted on superstructure side plates 17 and 18, and has affixed thereto a plurality of cam disks, which control and synchronize the oscillating movement of the carriage assembly, the vertical reciprocation of the pitting mechanism, and the interlock between the pitting mechanism and the main conveyor assembly. As earlier set forth, the pitting mechanism 166 is pivotally supported by a pair of links 169 and bell cranks 171 and 172. As appears in FIGS. 11 and 15, cams 212 and 212a are fixed to shaft 26. Each cam includes a contoured cam track 213 to control the fore and aft movement of the pitting mechanism 166 through cam follower roller 214 on upper leg 216 of the bell cranks 171 and 172 which are pivotally mounted on shaft 168. Pivotally fastened to lower leg 217 of bell crank 172 by bolt 218 and an eccentric fitting 219 is an extension 221 attached to pitting mechanism 166 through fitting 181. Eccentric member 219 permits precise angular adjustment of the pitting mechanism into parallelism with the cup bars 101.

Affixed to shaft 26 are cams 222 and 222a for actuation of the coring knives, as shown in FIGS. 12 and 15. Each of cams 222 and 222a has a contoured cam track 223 for guiding a cam follower roller 224 attached to a bell crank 226 and 226a. Each bell crank 226 and 226a is fixedly supported on transverse shaft 167 by means of set screws 230 in hubs 231 and is connected by pin 203 through a vertical link 228 or 228a to a clevis projection 202 on sleeve fitting 201 and 201a. Each bell crank assembly 226 comprises a generally triangular-shaped plate member 229 having a hub 231 and provided with slots accommodating a pair of lock screws 232 threaded into an adjustable lever arm 233, also pivotally supported on shaft 167. Bell crank 226 is fitted with two adjusting screws 225, similar to those shown on levers 258a and 259a (FIG. 17). These provide a single adjustment for both bell cranks 226 and 226a and enable the elevation of bar 206 and coring knives 322 to be altered and controlled. To achieve this, one loosens the screws 225 in the bell crank 226a. The adjusting movement of bell crank 226a is transmitted to bell crank 226 through shaft 167. Tightening screws 232 in both bell cranks lock them in a new position with bar 206 parallel to its former position. Thus, rotation of cams 222 and 222a results in vertical reciprocating movement of the coring knife support member 206.

Cams 236 and 236a are attached by screws 235 to the side of cams 222 and 222a respectively to operate the interlocking mechanism between the pitting mechanism 166 and chains 41 and 42 of the main conveyor assembly 96 (FIGS. 11, 13 and 15). A bell crank assembly 237 is pivoted on shaft 167 for each cam. Each bell crank has adjustably fastened thereto a lever arm 238 carrying a cam follower roller 239 riding over the surface of each cam. A compression spring 241 is positioned between a lobe 242 on arm 238 and a guide post 243 supported on bracket 244 secured to top plate 19. The spring urges roller 239 into positive engagement with the periphery of each cam 236 and 236a. Link member 247 connects an arm on each bell crank 237 to a latch element 248 pivotally supported at 249 on bracket 251 adjustably fastened to the pitting mechanism 166 by means of slot 250 and bolt 181 (FIG. 13). Each latch 248 is formed with a downwardly extending tapered tooth 252 which fits between a pair of rollers in the corresponding chain 41 or 42 as the pitting mechanism 166 travels forwardly in synchronization with chains 41 and 42, thus insuring true alignment of the cups 108, punches 303 and core knives 322 (FIG. 19).

A pair of oppositely facing cams 254 and 254a are keyed on shaft 26 to actuate transverse bar 198 carrying the punch elements (FIGS. 14 and 15). Each cam 254 and 254a is formed with a contoured track 256, cooperating with follower roller 257 on lever arm 258, adjustably bolted to a bell crank 259. Bell cranks 259 and 259a are fixed to hollow shafts 261 and 261a respectively, journalled on shaft 167, while the hubs of levers 258 and 258a are pivoted on shafts 261 and 261a. A pair of connecting links 262 and 262a are pivoted at 263 and 263a on bell cranks 259 and 259a and each link is fastened to cross bar 198 by a pin 264 extending through a pair of mounting blocks 266 bolted to the cross bar 198 (see FIG. 15).

The bell crank 259a is provided with a composite adjusting mechanism to permit parallel raising or lowering of the punch carrying bar 198. As is illustrated in FIGURES 17 and 18, bell crank 259a is welded to hollow shaft 261a journalled on shaft 167 while the hub of lever arm 258a is pivoted on shaft 261a. The cam following roller 257a is bolted to the upper end of lever 258a, and a link member 262a is pivotally supported at 263a to actuate cross bar 198. Adjusting screws 267 and 268 are threaded into offset lugs 269 and 271 welded to lever 258a and bell crank 259a respectively. Since the lower ends of screws 267 and 268 bear on juxtaposed parts 258a and 259a, backing-off one screw and tightening the other results in accurately controlled angular displacement of the two parts for adjustment purposes. A pair of screws 272 accommodated by slots 273 and 274 in each bell crank 259 and 259a provide for locking the parts together after adjustment. To permit bell cranks 259 and 259a to be adjusted simultaneously, sleeve member 276 is fitted to the inner ends of hollow shafts 261 and 261a (FIGS. 2 and 18) and secured thereto by set screws 277. Having brought the two bell cranks 259 and 259a into the same position with respect to the hollow shaft 276 and locking set screws 277, the two bell cranks 259 and 259a are simultaneously adjusted with the previously described mechanism to raise and lower the punch bar 198 in parallelism with the chain bar 101 and cups 108.

A transverse trough 336 having sloping sides 337 is installed between side plates 11 and 12 directly under the bottom portion of the pitting mechanism to receive pits and cores (FIGS. 1, 4 and 11). During operation of the pitting machine, fluid is supplied to trough 336 through a fitting 338 to flush the pits and cores into a waste container, not shown.

As previously set forth, chains 41 and 42 are driven by sprockets 39, thus carrying the cup supporting bars 101 around an arcuate path to an inverted position where the fruit is forcibly ejected by a plurality of fluid jets supplied from a pressure source (not shown) to a manifold 341 adjustably mounted on a pair of support arms 342 welded to spacer tube 13. The ejected fruit may be conveniently received in an inclined discharge tray member 343, supported at its rear by integral hook elements 344 and resting on transverse angle bar 346, as best appears in FIG. 4. The empty conveyor assembly continues rearwardly over and under take-up idlers 48 to pass around sprockets 43 to be in position for receiving fruit from the feed hopper.

*Pitting Mechanism*

The pitting mechanism is comprised of two spaced rows of punch assemblies 291 and cooperating coring knife and ejector assemblies 292 (FIGS. 11 and 19). Each punch assembly 291 is mounted in a plate 293 fastened to transverse cross bar 198 by bolts 294 (FIG. 2). A tubular housing 296 (FIG. 19) is formed with a lower end portion 297 of reduced internal diameter and an annular flange 298 at the upper end; each housing fits tightly in an aperture 307 in plate 293 with the flanged end 298 fitting in annular recess 308. A sleeve 299 is provided in the housing with its end 301 fitting in and extending beyond the end of the housing (FIG. 19). The end 301 is threaded at 302 to receive pitting knife or punch 303 which is secured in position by lock nut 304. Bushings 306 are provided between sleeve 299 and housing 296. A compression spring 309 is mounted between end 311 of sleeve 299 and a centering guide element 312 secured on cross-member 313 which is in turn secured to plate 293. The several springs in punch assemblies 291 positioned on plate 293 are each retained in position by member 313 when bar 293 with assemblies 291 are removed from the machine. Thus, the entire assembly can be readily exchanged or replaced by unscrewing only the two bolts 294 passing through cross bar 198 (FIG. 2).

Each coring knife assembly 292 is mounted in one of the plurality of spaced bores 316 provided in transverse member 206. Pressed into each of the bores 316 is a sleeve 317 having an enlarged upper portion 318. Slidably disposed within sleeve 317 is a tubular member 319 having an annular shoulder 321 at its lower extremity and being counterbored and tapped at its other end to receive the threaded end of a hollow coring knife 322; the knife is retained by a washer 323 and lock nut 324 which hold the knife fast against the end of member 319. Washer 323 serves as a stop shoulder to prevent member 319 from falling through the bore in sleeve 317. A plurality of pit ejector plungers 326 operate within coring knives 322. Each is mounted in a receptacle 327 in a cross member 328 to which the plungers 326 are secured by pins 329. Member 328 is removably fastened atop cross bar 186 by bolts 332.

Referring particularly to FIGS. 3 and 11, means are provided for removing a pit adhering to a punch 303 or projecting beyond the upper end of a coring knife 322. This means includes rods 341A and 342A which project transversely of the machine at a suitable elevation to engage and displace a pit riding in the top end of the coring knife 322 as appears in FIG. 25 or adhering to a punch. Rods 342A are supported by a cantilever arm 343 while rods 341A are supported by cantilever arms 344. The arms are secured by a clamp structure 346 (FIG. 11) to a rod at 347 which extends transversely across the machine. Rods 341A and 342A are provided in alignment but are spaced apart to permit T-shaped fittings 164 (FIGS. 9 and 10) to pass between the spaced ends of the rods.

*Pitting Operation*

In operation, fruit is carried forward from the feeding hopper to the pitting station between the side walls of the frame structure by the conveyor assembly 96 (FIG. 3). Each fruit is quickly and accurately aligned in a cup by the vibrating action provided by the simultaneous vertical and horizontal reciprocations. The oscillating movement of the pitting mechanism 166, including the pitting punches, coring knives and ejectors, comprises movement of the pitting mechanism from a rear position at an accelerated rate to a synchronized movement with the conveyor over approximately 180° of the rotation of cams 212 and 212a followed by deceleration and return to its rear position at a rate greater than the rate of forward motion. The conveyor assembly moves forward at a constant rate, specifically two carrier bars per cycle in the machine shown. Since the pitting mechanism provides for pitting two adjacent rows of fruit, the pitting mechanism moves forward a distance approximately equal to the width of a single carrier bar during pitting. The return motion of the pitting mechanism is accomplished during the forward travel of one carrier bar, thus bringing two more rows of fruit into position for pitting.

The relative movement of the pitting and coring mechanisms is particularly shown in the series of illustrations of FIGS. 20 through 26, while the timing chart FIG. 27 shows the movement of each unitary operating mechanism through a complete cycle.

In the machine of this invention, the adjustment is such that the pitting punch 303 engages the upper surface of the fruit. Depending on the size of the fruit, the punch penetrates the fruit to some extent and so holds the fruit in alignment in the cup. Since olives vary in size, the machine is preferably adjusted so the punch just engages the smallest olive to be pitted but will not engage the pit in the longer fruit. With the fruit engaged by the punch, the rate of application of pressure applied by the punch to the fruit is reduced to zero or a minimum value. This is preferably achieved by arresting the downward movement of the punch as by stopping the travel of the punch or at least reducing the rate of downward travel so that the rate of application of pressure applied by the punch through the fruit to the cup is either absent or is at a minimum value. During this time the coring knife has been approaching the fruit but is just short of engagement with the fruit. Immediately following the reduction in the rate of application of pressure on the fruit by the punch, the coring knife engages the fruit and commences cutting of the cylindrical core. With the cessation of further application of punch pressure and with the punch spaced from the pit, the pressure applied by the coring knife will force the fruit upwardly until the pit seats against the punch and with small fruit the fruit will be lifted free of the cup. The coring knife continues its travel until the core is cut to about a third of the length of the pit being engaged on one end by the punch and on the other end by the coring knife. Unless the pit is overly long, the only pressure on the pit at this point is that applied by the coring knife in cutting the core. With an overly long pit, the spring 309 is compressed as a safety measure.

Immediately following cutting of the core, the core knife support bar 206 is moved downwardly about one-fourth inch and out of supporting relationship for the core knife holder 319 and washer 323 so that no pressure can be exerted on the pit between the punch and core knife. Dropping of the bar 206 relieves any compression of spring by the presence of an overly long pit.

The coring assembly 292, being slidably mounted in bushing 317, may remain in contact with the pit due in part to inertia of the rapidly moving mechanisms involved and in part to the friction of the flesh of the fruit on the coring knife (FIG. 23). Until the punch starts to travel over that portion of its path of travel wherein the core and pit are ejected, there is no pressure on the pit due to the core knife 322 or the punch 303. This is a feature distinguishing the present machine from those used heretofore in which the pit at this stage is jammed forcefully between the coring knife and the punch and one or more springs are heavily compressed.

The punch 303 moves downwardly (FIG. 24) to press the olive into contact with the cup 108 but only with sufficient pressure to move the pit from the fruit. The floating core knife is suspended in the fruit and so prevents collapse of the lower half of the fruit as the pressure required to free the upper half of the pit from the fruit is transmitted to the inner conical surface of the cup 108. The punch forces the pit, core and core knife from the olive (FIG. 25).

The only pressure exerted on the pit by the punch during its removal from the olive is that required to free the pit from its grip on the uncut flesh of the olive. The punch concludes its downward progress after passage through the fruit and prior to that of the corer. The punch then starts upward, the corer continuing down a short distance, carrying the pit and core with the latter inside the hollow knife 322 (FIG. 25). As the punch 303 returns to its upper position, any fruit which clings to the punch and rides out of the cup is removed by a pair of stripper rods 334. As is shown in FIG. 25, the pit projecting beyond the upper end of a coring knife 322 or remaining on a punch will engage one of the rods 341A or 342A and be displaced. If the core remains within the coring knife, it is ejected by the plunger 326 as is shown in FIG. 26.

Bar 206, the coring knife support, is at rest for the time required for the carriage structure 166 to decelerate and begin its return movement whereup the hollow coring knife is moved downwardly over the ejector plunger 326 to drive the pit and core cut and away from the coring knife (FIG. 26). The delay in the ejector actuation is to the end that the pit and core may not be ejected back into the fruit.

It is to be pointed out that spring 309 backing the punch plays no part in the ejection of the pit. Its sole function is to accommodate any overly long pits encountered and to act as a safety device as when an olive is crosswise in the cup 108 and the pit cannot be forced through the aperture in the bottom of cup 108. Any compression of spring 309 because of an overly long pit is relieved following cutting of the core by dropping the bar 206 about ¼" before ejection of the pit begins.

In the machine shown in FIGURES 28–32, I provide the coring knife with a light spring 401 so that when an over-length pit is encountered, this light spring permits the core knife to stop its upward travel when the end of an over-long pit is encountered, the light spring being easily compressed. Thus, referring particularly to FIGURES 28–31:

I provide a thimble 400 slidably mounted on the end of an outer sleeve 403. Spring 401 is mounted between the core bar 206 and thimble 400 and is preloaded to the extent that spring 401 does not compress during cutting of the core, but may be compressed when an over-sized pit is encountered. The snap ring 402 mounted on the end of sleeve 403 limits the upward travel of the thimble and maintains the preload of spring 401. Sleeve 319 is slidable in sleeve 403 and carries core knife 322 threaded into its upper end. Core knife 322 is locked in position by lock nut 324 with washer 323 clamped between an end of sleeve 319 and nut 324. Washer 323 normally rests on the thimble 400 and may push thimble 400 downwardly as shown in FIGURE 30, compressing spring 401 when pressure sufficient to overcome the preload of spring 401 is applied to the core knife 322. When no olive is in place, the core knife 322, washer 323 and nut 324 attached to the sleeve 319 are in the position shown in FIGURE 28 where there is no compression other than the pre-load of spring 401. In the position shown in FIGURE 28 the sleeve 319 is resting in a downwards position and the shoulder 404 at the lower end of sleeve 319 is spaced from bar 206 by approximately ¼". With no olive in place the assembly of sleeve 319 with knife 322, washer 323 and nut 324 may freely slide approximately ¼" between shoulder 404 and washer 323 and may occupy the position shown in FIGURE 29 where shoulder 404 is against bar 206 to prevent further upward motion of sleeve 319.

The action of this mechanism may be further understood by comparing the showings of FIGURES 28 and 29 with the showings of FIGURES 30 and 31. In FIGURE 28, I have shown an olive of relatively small size at the 70° position in the cam chart of FIGURE 32 and wherein pitting punch and the coring knife are both in engagement with the pit of the fruit. The pitting punch and the coring knife are so adjusted relative to one another that the small fruit is lifted free of the cup without compression of spring 401, the core knife being just in contact with the pit, as appears in FIGURE 28. However, when the core bar 206 is moved down about one-quarter inch prior to pit ejection, the olive and core knife assembly remains in the same relative position to the cup, as appears in FIGURE 29, which is 90° position on FIGURE 32, and the core knife assembly is not supported by thimble 400. The olive and core knife assembly are maintained in the upward position by friction of punch 303 and core knife 322 within the olive. At normal operating speeds, inertia assists friction in maintaining this upward position. With a larger size olive having a larger pit, as is shown in FIGURES 30 and 31, the fruit may remain in engagement with the cup and the spring 401 is compressed slightly as may be seen by comparing the showing in FIGURE 30, which is 70° on the cam chart of FIGURE 32, with that in FIGURE 28. This action can also be seen by referring to the timing chart for this mechanism as is shown in FIGURE 32, where one should note the dotted line showing the position of the coring knife in the case of fruit having a small pit as compared with that having a large pit. The compression of spring 401 is relieved, as is shown in FIGURE 31, which is 90° on FIGURE 32, when the core bar 206 is lowered about one-quarter inch prior to pit ejection. During pit ejection, spring 401 is not compressed and the core knife assembly is floating with neither washer 323 or shoulder 403 in contact with thimble 400 or bar 206.

The use of the comparatively light spring 401 on the core knife increases materially the ability of the machine to handle olives having different pit sizes without subjecting the long pits to a spring force as great as that of punch spring 309. Spring 401 has a force about one-fourth that of punch spring 309. Thus, the pit is subjected to a force during coring substantially less than the pit ejection force, with a reduction of the tendency to shatter or fragment pits. Thus, the maximum force applied to the pit by punch 303 is that force required to break the grip of the uncut meat from the pit. The ejection of the pit is unopposed by spring 401 since no compression of the spring by the pit exists during pit ejection.

It will be apparent from the foregoing description that I have provided a relatively novel, improved, high-volume, rugged, and simple machine for orienting and pitting fruit.

This application is a continuation-in-part of application Serial No. 125,785 filed July 21, 1961.

I claim:
1. In a fruit pitting machine:
   (a) means for holding fruit with opposed ends exposed;
   (b) means for advancing said holding means to a fruit-pitting station;
   (c) an opposed punch and coring knife mounted coaxially at said pitting station for reciprocating action toward and away from one another;
   (d) means for moving said punch toward said coring knife to contact and penetrate fruit held at said pitting station and for stopping movement of said punch after said fruit is contacted and before the pit thereof is contacted;
   (e) means operatively associated with the means of paragraph (d) for moving said coring knife toward said punch a sufficient distance to contact and penetrate fruit held at said pitting station after said means of paragraph (d) has moved said punch to contact said fruit and has stopped movement of said punch;
   (f) means for releasing said coring knife to permit free axial movement of said coring knife so as to permit said knife to move away from said punch on application of pressure to the end of the said coring knife opposed to the said punch;
   (g) and means operatively associated with the releasing means of paragraph (f) for again moving said punch in the same direction as in paragraph (d) after the releasing means of paragraph (f) has released said coring knife.
2. In a fruit pitting machine:
   (a) a plurality of cups having open tops and bottoms for holding fruit with opposed ends exposed;
   (b) a conveyor supporting the said cups horizontally and for advancing the said cups to a fruit pitting station;
   (c) an opopsed punch and coring knife mounted coaxially for reciprocating action respectively above and below a cup at the pitting station, said punch and coring knife being mounted for reciprocating action toward and away from the exposed ends of said fruit in the said cup;
   (d) means for moving said punch toward said coring knife to contact and penetrate the fruit held at said pitting station and for stopping movement of said punch after said fruit is contacted and before the pit thereof is contacted;
   (e) means operatively associated with the means of paragraph (d) for moving said coring knife toward said punch a sufficient distance to contact and penetrate fruit in a cup at said pitting station after said means of paragraph (d) has moved said punch to contact said fruit and has stopped movement of said punch;
   (f) means for releasing said coring knife to permit free axial movement of said coring knife so as to permit said knife to move away from said punch on application of pressure to the end of said coring knife opposed to the said punch;
   (g) and means operatively associated with the releasing means of paragraph (f) for again moving said punch in the same direction as in paragraph (d) after the releasing means of paragraph (f) has released the said coring knife.
3. In a fruit pitting machine:
   (a) means for holding fruit with opposed ends exposed;
   (b) means for advancing said fruit holding means to a fruit pitting station;
   (c) an opposed punch and coring knife mounted coaxially of said pitting station for reciprocating action toward and away from one another;
   (d) means for moving said punch toward said coring knife to contact and penetrate fruit held at said pitting station and for stopping movement of said punch after said fruit is contacted and before the pit thereof is contacted;
   (e) means operatively associated with the means of paragraph (d) for moving said coring knife toward said punch a sufficient distance to contact said fruit, raise said fruit until the pit thereof contacts the said punch, and penetrate fruit held at said pitting station after said means of paragraph (d) has moved said punch to contact said fruit and has stopped movement of said punch;
   (f) means for releasing said coring knife to permit free axial movement of said coring knife so as to permit said knife to move away from said punch on application of pressure to the end of said coring knife opposed to said punch;
   (g) and means operatively associated with the releasing means of paragraph (f) for again moving said punch in the same direction as in paragraph (d) after the releasing means of paragraph (f) has released said coring knife to eject the said coring knife from the fruit by applying pressure to the end thereof opposed to the said punch.
4. In a fruit pitting machine:
   (a) means for holding fruit with opposed ends exposed;
   (b) means for advancing said holding means to a fruit pitting station;
   (c) an opposed punch and coring knife mounted coaxially for reciprocating action toward and away from the exposed ends of said fruit and toward and away from one another, said punch and coring knife being mounted at said pitting station;
   (d) means for moving said punch toward said coring knife and the pit in said fruit to contact and penetrate fruit held at said pitting station, said means moving said punch a distance insufficient to cause said punch to contact said pit;

(e) means operatively associated with the means of paragraph (d) for moving said core knife toward said punch a distance sufficient to contact fruit held at said pitting station and move said fruit out of said holding means a distance sufficient to cause said punch to contact said pit and to cause said core knife to cut a core in said fruit, said means being synchronized with the means of paragraph (d) to permit said core knife moving means to move said core knife to contact said fruit only after the fruit has been contacted by said punch through the action of the means of paragraph (d);

(f) means for releasing said coring knife to permit free axial movement of said coring knife so as to permit said knife to move away from said punch on application of pressure to the end of said coring knife opposed to said punch;

(g) and means operatively associated with the releasing means of paragraph (f) for again moving said punch in the same direction as in paragraph (d) after the releasing means of paragraph (f) has released said coring knife to eject the said coring knife from the fruit by applying pressure to the end thereof opposed to the said punch.

References Cited in the file of this patent
UNITED STATES PATENTS

| | | |
|---|---|---|
| 1,458,163 | Whitman et al. | June 12, 1923 |
| 2,232,124 | Markley | Feb. 18, 1941 |
| 2,271,675 | Ashlock | Feb. 3, 1942 |
| 2,308,039 | Ashlock | Jan. 12, 1943 |
| 2,341,857 | Drake et al. | Feb. 15, 1944 |
| 2,360,411 | Frova | Oct. 17, 1944 |
| 2,387,709 | Ashlock | Oct. 30, 1945 |
| 2,407,126 | Ashlock | Sept. 3, 1946 |
| 2,528,293 | Ashlock | Oct. 31, 1950 |
| 2,567,591 | Ashlock | Sept. 11, 1951 |
| 2,821,226 | Kagley et al. | Jan. 28, 1958 |
| 2,924,259 | Magnuson | Feb. 9, 1960 |